(12) United States Patent
Branagan et al.

(10) Patent No.: US 6,258,185 B1
(45) Date of Patent: Jul. 10, 2001

(54) METHODS OF FORMING STEEL

(75) Inventors: Daniel J. Branagan, Iona; Joseph V. Burch, Shelley, both of ID (US)

(73) Assignee: Bechtel BWXT Idaho, LLC, Idaho Falls, ID (US)

(*) Notice: Subject to any disclaimer, the term of this patent is extended or adjusted under 35 U.S.C. 154(b) by 0 days.

(21) Appl. No.: 09/318,242

(22) Filed: May 25, 1999

(51) Int. Cl.$^7$ ................. C21D 1/09; C23C 4/08
(52) U.S. Cl. .............. 148/525; 148/529; 148/561
(58) Field of Search .................. 148/565, 529, 148/540, 561, 525

(56) References Cited

U.S. PATENT DOCUMENTS

| Re. 32,925 | 5/1989 | Chen et al. |
|---|---|---|
| 3,986,867 | 10/1976 | Masumoto et al. |
| 3,989,517 | 11/1976 | Tanner et al. |
| 4,144,058 | 3/1979 | Chen et al. |
| 4,290,808 | 9/1981 | Ray. |
| 4,386,896 | 6/1983 | Ray. |
| 4,523,621 | 6/1985 | Ray. |
| 4,576,653 * | 3/1986 | Ray .......................... 148/3 |
| 4,581,081 | 4/1986 | Kroeger et al. |
| 5,589,011 | 12/1996 | Gonsalves. |

FOREIGN PATENT DOCUMENTS 1-275717 * 11/1989 (JP).

OTHER PUBLICATIONS

J.V. Armstrong, et al.; "Enhanced Corrosion Resistance in $Nd_{15}Fe_{77}B_8$ by Laser Surface Amorphization"; Hyperfine Interactions vol. 46, 1989; pp. 467–471.

W.L. Johnson; "Metallic Glasses"; Keck Laboratory of Engineering, California Institute of Technology; pp. 804–821.

A. Peker et al.; "Time–temperature–transformation diagram of a highly processable metallic glass"; Materials Science and Engineering A179/A180, 1994; pp. 173–175.

* cited by examiner

Primary Examiner—George Wyszomierski
Assistant Examiner—Janelle Combs-Marillo
(74) Attorney, Agent, or Firm—Wells St John Roberts Gregory and Matkin

(57) ABSTRACT

In one aspect, the invention encompasses a method of forming a steel. A metallic glass is formed and at least a portion of the glass is converted to a crystalline steel material having a nanocrystalline scale grain size. In another aspect, the invention encompasses another method of forming a steel. A molten alloy is formed and cooled the alloy at a rate which forms a metallic glass. The metallic glass is devitrified to convert the glass to a crystalline steel material having a nanocrystalline scale grain size. In yet another aspect, the invention encompasses another method of forming a steel. A first metallic glass steel substrate is provided, and a molten alloy is formed over the first metallic glass steel substrate to heat and devitrify at least some of the underlying metallic glass of the substrate.

22 Claims, 16 Drawing Sheets

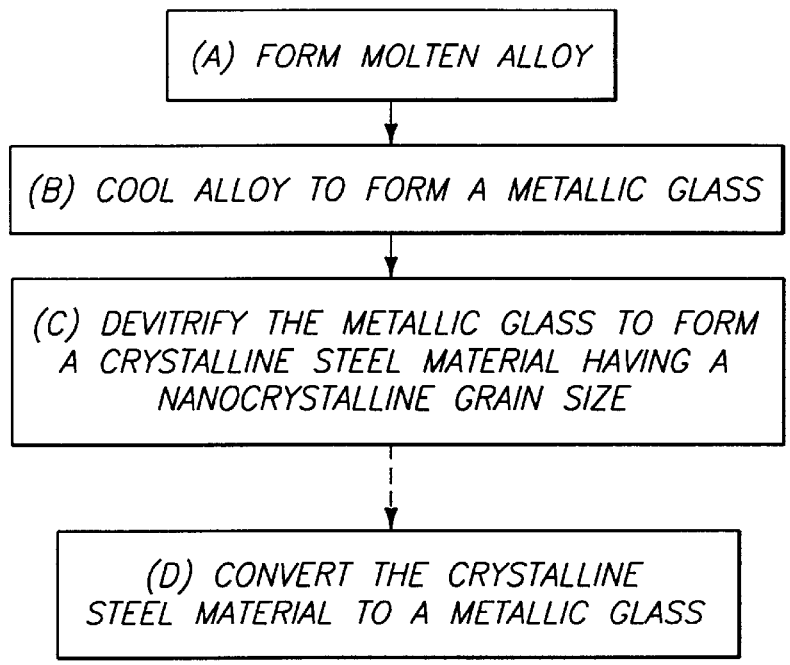
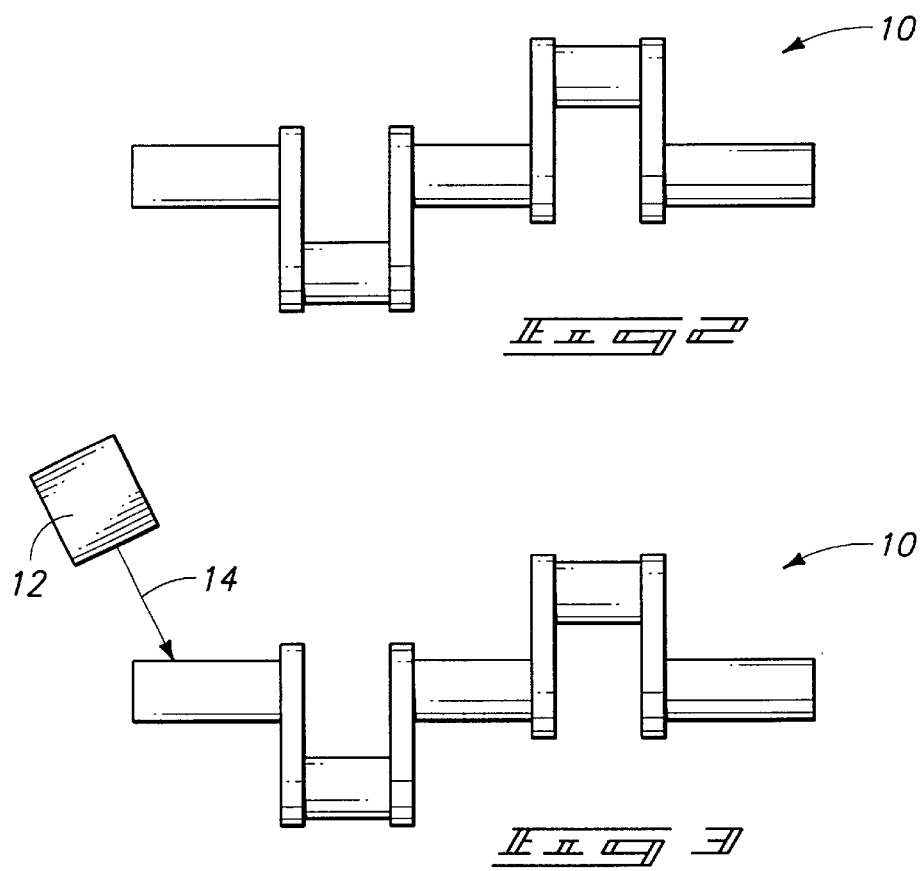

METHODS OF FORMING STEEL

CONTRACTUAL ORIGIN OF THE INVENTION

The United States Government has rights in this invention pursuant to Contract No. DE-AC07-94ID13223 between the United States Department of Energy and Lockheed Martin Idaho Technologies Company.

TECHNICAL FIELD

The invention pertains to methods of forming steel.

BACKGROUND OF THE INVENTION

Steel is a metallic alloy which can have exceptional strength characteristics, and which, accordingly, is commonly utilized in structures where strength is required or advantageous. Steel can be utilized in, for example, the skeletal supports of building structures, tools, engine components, and protective shielding of modern armaments.

The composition of steel varies depending on the application of the alloy. For purposes of interpreting this disclosure and the claims that follow, "steel" is defined as any iron-based alloy in which no other single element (besides iron) is present in excess of 30 weight percent, and for which the iron content amounts to, at least, 55 weight percent, and carbon is limited to a maximum of 2 weight percent. In addition to iron, steel alloys can incorporate, for example, manganese, nickel, chromium, molybdenum, and/or vanadium. Steel alloys can also incorporate carbon, silicon, phosphorus and/or sulfur. However, phosphorus, carbon, sulfur and silicon can be detrimental to overall steel quality if present in quantities greater than a few percent. Accordingly, steel typically contains small amounts of phosphorus, carbon, sulfur and silicon.

Steel comprises regular arrangements of atoms, with the periodic stacking arrangements forming 3-dimensional lattices which define the internal structure of the steel. The internal structure (sometimes called "microstructure") of conventional steel alloys is always metallic and polycrystalline (consisting of many crystalline grains).

Steel is typically formed by cooling a molten alloy. The rate of cooling will determine whether the alloy cools to form an internal structure that predominately comprises crystalline grains, or, in rare cases, a structure which is predominately amorphous (a so-called metallic glass). Generally, it is found that if the cooling proceeds slowly (i.e., at a rate less than about $10^4$ K/s), large grain sizes occur, while if the cooling proceeds rapidly (i.e., at a rate greater than or equal to about $10^4$ K/s) microcrystalline internal grain structures are formed, or, in specific rare cases amorphous metallic glasses are formed. The particular composition of the molten alloy generally determines whether the alloy solidifies to form microcrystalline grain structures or an amorphous glass when the alloy is cooled rapidly. Also, it is noted that particular alloy compositions have recently been discovered which can lead to microscopic grain formation, or metallic glass formation, at relatively low cooling rates (cooling rates on the order of 10 K/s), but such alloy compositions are, to date, bulk metallic glasses that are not steels.

Both microcrystalline grain internal structures and metallic glass internal structures can have properties which are desirable in particular applications for steel. In some applications, the amorphous character of metallic glass can provide desired properties. For instance, some glasses can have exceptionally high strength and hardness. In other applications, the particular properties of microcrystalline grain structures are preferred. Frequently, if the properties of a grain structure are preferred, such properties will be improved by decreasing the grain size. For instance, desired properties of microcrystalline grains (i.e, grains having a size on the order of $10^{-6}$ meters) can frequently be improved by reducing the grain size to that of nanocrystalline grains (i.e., grains having a size on the order of $10^{-9}$ meters). It is generally more problematic to form grains of nanocrystalline grain size than it is to form grains of microcrystalline grain size. Accordingly, it is desirable to develop improved methods for forming nanocrystalline grain size steel materials. Further, as it is frequently desired to have metallic glass structures, it is desirable to develop methods of forming metallic glasses.

SUMMARY OF THE INVENTION

In one aspect, the invention encompasses a method of forming a steel. A metallic glass is formed and at least a portion of the glass is converted to a crystalline steel material having a nanocrystalline scale grain size.

In another aspect, the invention encompasses another method of forming a steel. A molten alloy is formed and cooled at a rate which forms a metallic glass. The metallic glass is devitrified to convert the glass to a crystalline steel material having a nanocrystalline scale grain size.

In yet another aspect, the invention encompasses another method of forming a steel. A metallic glass steel substrate is provided, and a molten alloy is formed over the metallic glass steel substrate to heat and devitrify at least some of the underlying metallic glass of the substrate.

BRIEF DESCRIPTION OF THE DRAWINGS

Preferred embodiments of the invention are described below with reference to the following accompanying drawings.

FIG. 1 is a block-diagram view of a method encompassed by the present invention.

FIG. 2 is a diagrammatic side-view of a shaft formed according to a method of the present invention.

FIG. 3 is a diagrammatic, side-view of the shaft of FIG. 2 at a processing step subsequent to that of FIG. 2.

FIG. 9 is a graph of delta T vs. temperature illustrating data obtained by a differential thermal analysis scan (10° C./min) of an alloy identified below as DNA3. The alloy was processed by melt-spinning at a wheel tangential velocity of 15 m/s. The exothermic glass to metastable crystalline and metastable crystalline to crystalline transitions can be seen at 525° C. and 600° C., respectively. The endothermic melting events can be seen at 1150° C. and 1175° C.

FIG. 10 is a graph of weight percent vs. particle size, illustrating data obtained by sieve analysis of an alloy identified below as DNS2C after inert gas atomization. A gaussian distribution of powder sizes from submicron to over 150 µm was found. The average powder particle size was 40 µm.

FIG. 14 is a backscattered electron micrograph of a heat-treated (700° C. for 1 hour) 75–100 µm gas atomized powder particle of the alloy identified as DNS2C. The multiphase composite structure can be seen readily and the scale of the grains and phases is very fine (below 1 µm).

FIG. 17 is a graph of elastic modulus versus indentor depth for four samples of DNS2C powder (10–20 µm as-atomized, 10–20 µm heat treated at 700° C. for 1 hour, 75–100 µm as-atomized, 75–100 µm heat treated at 700° C. for 1 hour). The powder particles exhibited very high elastic moduli typically from 150 to 300 GPa.

FIG. 18 is a graph of hardness versus indentor depth for four samples of DNS2C powder (10–20 µm as-atomized, 10–20 µm heat treated at 700° C. for 1 hour, 75–100 µm as-atomized, 75–100 µm heat treated at 700° C. for 1 hour). The powder particles exhibited very high hardness typically from 10 to 18 GPa.

DETAILED DESCRIPTION OF THE PREFERRED EMBODIMENTS

Figure 4:
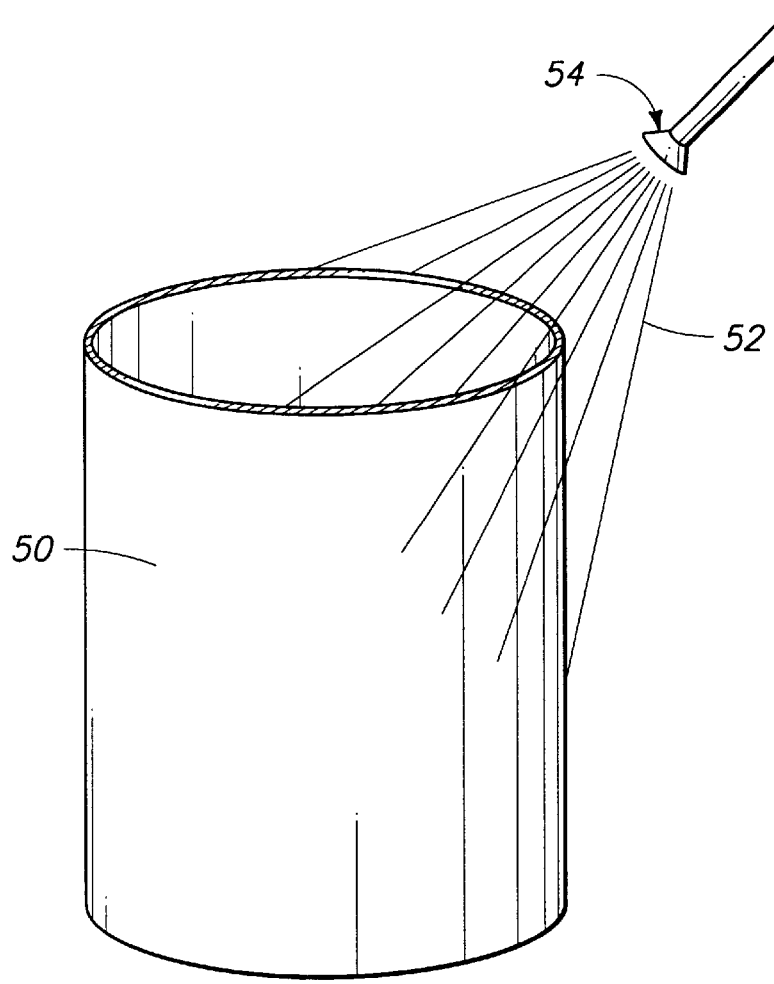
FIG. 4 is a diagrammatic perspective view of a barrel being treated according to a method of the present invention.

This disclosure of the invention is submitted in furtherance of the constitutional purposes of the U.S. Patent Laws "to promote the progress of science and useful arts" (Article 1, Section 8).

The invention encompasses methodology for forming steel materials having nanocrystalline scale composite microstructures, and methods of utilizing such steel materials. A process encompassed by the present invention is described generally with reference to the block diagram of FIG. 1. At an initial step (A) a molten alloy is formed. Such alloy comprises a steel composition. An exemplary alloy comprises at least 50% Fe, at least one element selected from the group consisting of Ti, Zr, Hf, V, Nb, Ta, Cr, Mo, W, Al, La, Ce, Pr, Nd, Sm, Eu, Gd, Tb, Dy, Ho, Er, Tm, Yb, and Lu; and at least one element selected from the group consisting of B, C, N, O, P and S. Particular compositions of the alloy are listed in Table 1. The alloy of step (A) can be formed by, for example, melting a composition under an argon atmosphere.

TABLE 1

| Alloy Designation | Composition |
| --- | --- |
| DNS2C | $Fe_{63}Cr_8Mo_2B_{17}C_5Si_1Al_4$ |
| DNA3 | $Fe_{64}Ti_3Cr_5Mo_2B_{16}C_5Si_1Al_2Gd_2$ |
| DNA6 | $Fe_{56}Ni_8Ti_3Cr_5Mo_2B_{16}C_5Si_1Al_2Gd_2$ |

At step (B) of FIG. 1 the alloy is cooled to form a metallic glass. Such cooling typically comprises a rate of at least about $10^4$ K/s, with the rate varying depending on the particular composition of the molten alloy. The cooling can be accomplished by a number of different processes, including, for example, melt-spinning, gas atomization, centrifugal atomization, and splat quenching. The powder can be consolidated by, for example, hipping, hot pressing, hot extrusion, powder rolling, powder forging and dynamic compaction. In an exemplary method, the cooling of step (B) is accomplished by centrifugal atomization. Preferably, the melt stream leaves a centrifugal cup and is hit by high pressure helium gas to facilitate fast cooling (greater than $10^5$ K/s). The helium gas can be collected, purified and reused. The speed of the rotating centrifugal cup is preferably about 40,000 RPM, and such speed can be adjusted to produce a fine powder with about a 25 micrometer mean size.

Referring to step (C) of FIG. 1, the metallic glass of step (B) is devitrified to form a crystalline steel material having a nanocrystalline grain size. Such devitrification can be accomplished by heating the metallic glass to a temperature of from about 600° C. to less than the melting temperature of the glass. Such heating enables a solid state phase change wherein the amorphous phase of the metallic glass is converted to one or more crystalline solid phases. The solid state devitrification of the amorphous precursor from step (B) enables uniform nucleation to occur throughout the metallic glass to form nanocrystalline grains within the glass. The metal matrix microstructure formed via the devitrification can comprise a steel matrix (iron with dissolved interstitials), with an intimate mixture of ceramic precipitates (transition metal carbides, borides, silicides, etc.). The nanocrystalline scale metal matrix composite grain structure can enable a combination of mechanical properties which are improved compared to the properties which would exist with larger grain sizes or with the metallic glass. Such improved mechanical properties can include, for example, high strength, and high hardness coupled with significant ductility.

The particular temperature employed for devitrifying the metal glass can be varied depending on the particular alloy utilized in the glass, and a particular time of application.

Referring to step (D) of FIG. 1, the devitrified metallic material from step (C) can be subsequently treated to convert the crystalline steel material back to a metallic glass. The post treatment of the devitrified metallic material from step (C) can be a surface treatment utilized to convert only the surface of the material to a metallic glass. Exemplary surface treatment techniques are high and low pressure plasma spraying, spray forming, and laser glazing.

The arrow proceeding from step (C) of FIG. 1 to step (D) is shown with dashed line to indicate that step (D) is optional. However, step (D) can offer improvements in, for example, corrosion resistance and lowering the coefficient of friction of a steel material. Accordingly, it can be advantageous to treat at least the surface of a crystalline steel material to convert such surface to a metallic glass. It is noted that a metallic glass coating can also offer advantages over existing coatings such as, for example, chrome, nickel and tin plating in that the metallic glass coating can be cheaper and can give a better metallurgical bond between the surface and the base metal (as the surface and the base metal have the same composition).

Detailed transmission electron microscopy (TEM) studies have revealed that the average grain size of devitrified steel structures formed by methods described with reference to FIG. 1 is approximately 80 nanometers. Further, scanning electron microscopy (SEM) and transmission electron microscopy (TEM) studies indicate that metallic materials formed by methods of the present invention have intimate mixtures of several phases. From x-ray diffraction scans, the matrix phase has been identified as α—Fe with dissolved interstitials. Secondary phases with ceramic character have also been identified including, $(TiZr)_1C_1$, $(CrMo)_{23}C_6$, $Fe_{23}B_6$, and $AlFe_3C_{0.5}$. The secondary phases are thermodynamically stable and all appear to be based on cubic systems, which can aid in the development of ductility for the steel materials. The devitrified steel materials of the present invention have been found to have extreme diamond pyramid hardness (DPH), with numbers over 1600 being determined by microhardness tests. Such numbers are beyond the $R_c$ measuring scale, and far beyond those of any existing steel. Note that a DPH number of 940 corresponds to an $R_c$ of 68 which would be the hardness of a tool steel. Tensile testing indicates that a yield strength of a powder is about 725 ksi (obtained from nanoindentor testing using a Berkovich indentor). Note that this value is much higher than ultrahigh strength steels, which are defined as having a yield strength greater than or equal to 200 ksi.

Specific examples of methods of the present invention are described with reference to FIGS. 2–8. Referring initially to FIG. 2, a method of the present invention can be utilized for forming a shaft 10. Specifically, an alloy comprising $Fe_{71}Ti_3Cr_7B_{14}C_3Si_2$ is formed as a melt. Subsequently, the melt is gas atomized to cool the melt at a sufficient rate (at least about $10^4$ K/s, and generally less than $10^5$ K/s) to produce a fine powder of metallic glass. The metallic glass powder is vacuum sealed in a mild steel can and then extruded at 850° C. with a 12 to 1 extrusion ratio. The heating which occurs during the extrusion of shaft 10 causes devitrification of the metallic glass, and results in the metallic material of shaft 10 having a nanocrystalline grain structure. The mild steel can is machined off the extruded bar, and the bar is further machined to form shaft 10. Shaft 10 can be extremely hard and wear resistant, and exceptionally strong. A post heat treatment of about 750° C. can be used to further increase the strength of shaft 10.

Referring to FIG. 3, the shaft 10 of FIG. 2 is subjected to laser glazing to treat a surface of the shaft. Specifically, a laser apparatus 12 is provided and configured to emit a laser beam 14 which strikes the surface of shaft 10. Laser beam 14 causes a thin layer of the surface to melt. Such thin layer preferably cools at a rate sufficient for metallic glass formation, and accordingly solidifies with an amorphous structure. The formation of a metallic glass surface over shaft 10 can offer advantages including corrosion resistance and a low coefficient of friction. Further, the metallic glass coating can offer advantages over traditional coating such as, for example, chrome, nickel and tin plating. One of such advantages is that the treated surface will bond better with the underlying material of shaft 10 than would chrome, nickel or tin plating, as the metallic glass and base metal of shaft 10 have similar metallic compositions.

Although FIGS. 2 and 3 specifically describe an embodiment of the invention wherein a shaft is formed, it is to be understood that the invention encompasses formation of many other metallic structures besides shafts. For instance, the combination of devitrification of a metallic substrate to form a nanocrystalline grain structure throughout the substrate, followed by a treatment of the surface of the substrate to form a metallic glass coating, can be useful in a number of applications. Such applications include, for example, applications in which it is desired to have an extremely strong steel material covered with a wear-resistant anticorrosive coating. Utilization of methods of the present invention may allow replacement of costly stainless steel in many applications.

Referring to FIG. 4, another embodiment application of the present invention is illustrated. Specifically, FIG. 4 illustrates a metallic barrel 50 being sprayed with a molten metal material 52. Molten metal material 52 is sprayed from a spraying device 54, and can comprise, for example, $Fe_{69}Zr_3Mo_7P_{16}C_3Si_2$, DNS2C, DNA3 or DNA6 The molten metal can be formed by melting an alloy composition under an argon atmosphere and subsequently centrifugally atomizing the alloy composition. As the melt stream leaves a centrifugal cup, it can be hit by a high pressure helium gas to form a fine powder of solidified metallic alloy material with such fine powder having about a 25 micrometer mean size. The fine powder can be fed into a plasma (high or low pressure) system wherein it is converted to a liquid spray which is sprayed on the inside and outside of metallic drum 50. In particular applications, drum 50 comprises a steel drum, such as, for example, a 55 gallon steel drum. It is noted that the powder may not be melted upon exposure to the plasma, but may instead simply be heated and deposited into and on barrel 50 as a fine powder. In either event, the metallic material 52 sprayed onto and within drum 50 cools rapidly to form a metallic glass. Drum 50 can be subsequently heat treated at a temperature of equal to or greater than 600° C. to devitrify the metallic glass.

The metallic structure formed over and within barrel 50 from material 52 can have greater corrosion resistance than stainless steel. Drum 50 can be utilized, for example, for storing corrosive and otherwise dangerous materials, such as, for example, spent nuclear fuel. If a surface of material 52 is reconverted to a metallic glass, the anti-corrosive properties and low coefficient of friction properties associated with metallic glass can be obtained.

Figure 5:
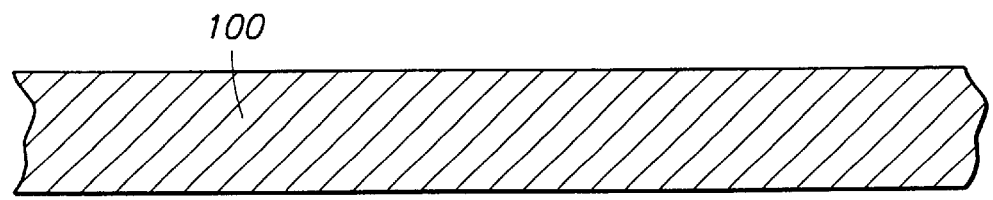
FIG. 5 is a fragmentary, diagrammatic, cross-sectional view of a metallic material substrate at a preliminary step of a treatment process encompassed by the present invention.

FIGS. 5–8 illustrate another embodiment application of the present invention. Referring to FIG. 5, a metallic substrate 100 is provided. Such substrate can comprise, for example, one or more materials selected from the group consisting of $Fe_{69}Zr_3Mo_7P_{16}C_3Si_2$, $Fe_{71}Ti_3Cr_7B_{14}C_3Si_2$, $Fe_{68}Cr_4Mo_7P_{12}B_6C_3$, DNS2C, DNA3 and DNA6.

Figure 6:
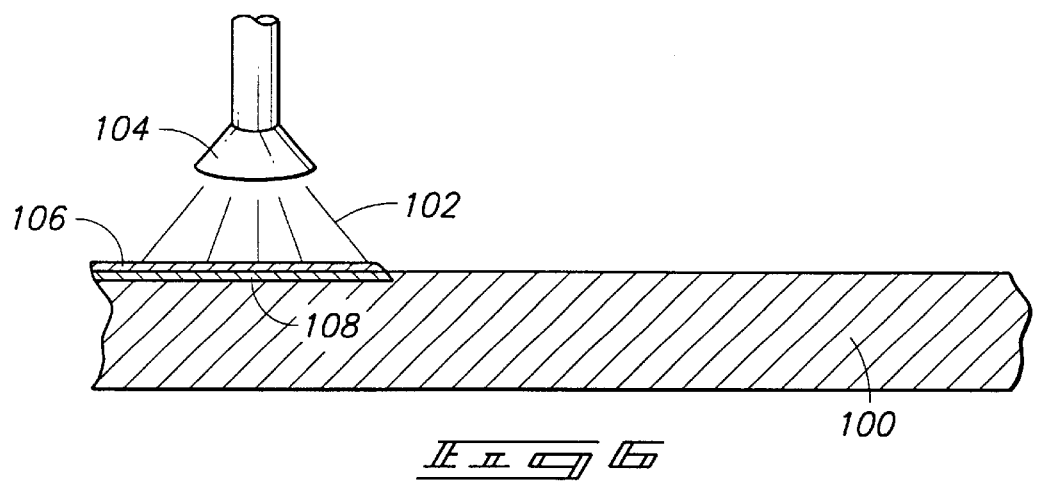
FIG. 6 is a view of the FIG. 5 fragment shown at a processing step subsequent to that of FIG. 5.

Referring to FIG. 6, a metallic melt 102 is sprayed onto substrate 100 utilizing a sprayer 104. Melt 102 can comprise, for example, a molten alloy of $Fe_{68}Cr_4Mo_7P_{12}B_6C_3$. Alternatively, material 102 can comprise a powder material heated to a sufficient temperature to bond with the metal of layer 100.

Material 102 deposits on substrate 100 to form a layer 106. Material 102 also heats an exposed surface of material 100 to form a heat-treated portion 108 of material 100. If material 100 comprises a metallic glass, heat-treated portion 108 can comprise a devitrified material. Specifically, if layer 106 is formed at a temperature which heats a surface of layer 100 to greater than 600° C., such heating can devitrify a portion of material 100 exposed to such temperatures. In particular applications, temperatures greater than 600° C. can permeate entirely through substrate 100 to heat-treat an entire thickness of material 100. Spray nozzle 104 is preferably resistant to the temperature and composition of material 102.

Figure 7:
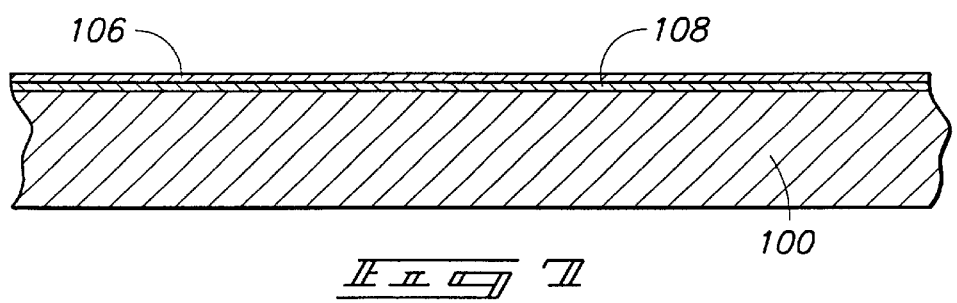
FIG. 7 is a view of the FIG. 5 fragment shown at a processing step subsequent to that of FIG. 6.

Referring to FIG. 7, substrate 100 is illustrated after layer 106 has been formed across an entire surface of substrate 100. Heat-treated portion 108 also extends across an entire surface of substrate 100. In particular embodiments, layer 106 can be formed as a metallic glass.

Figure 8:
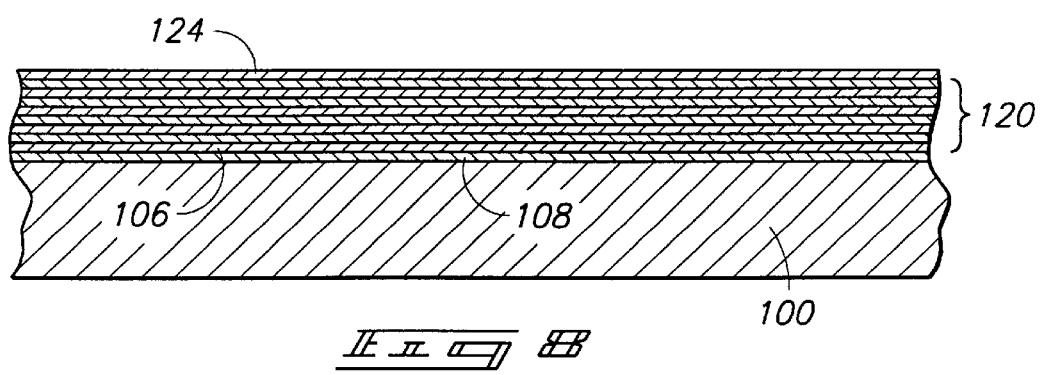
FIG. 8 is a view of the FIG. 5 fragment shown at a processing step subsequent to that of FIG. 7.
Figure 4:
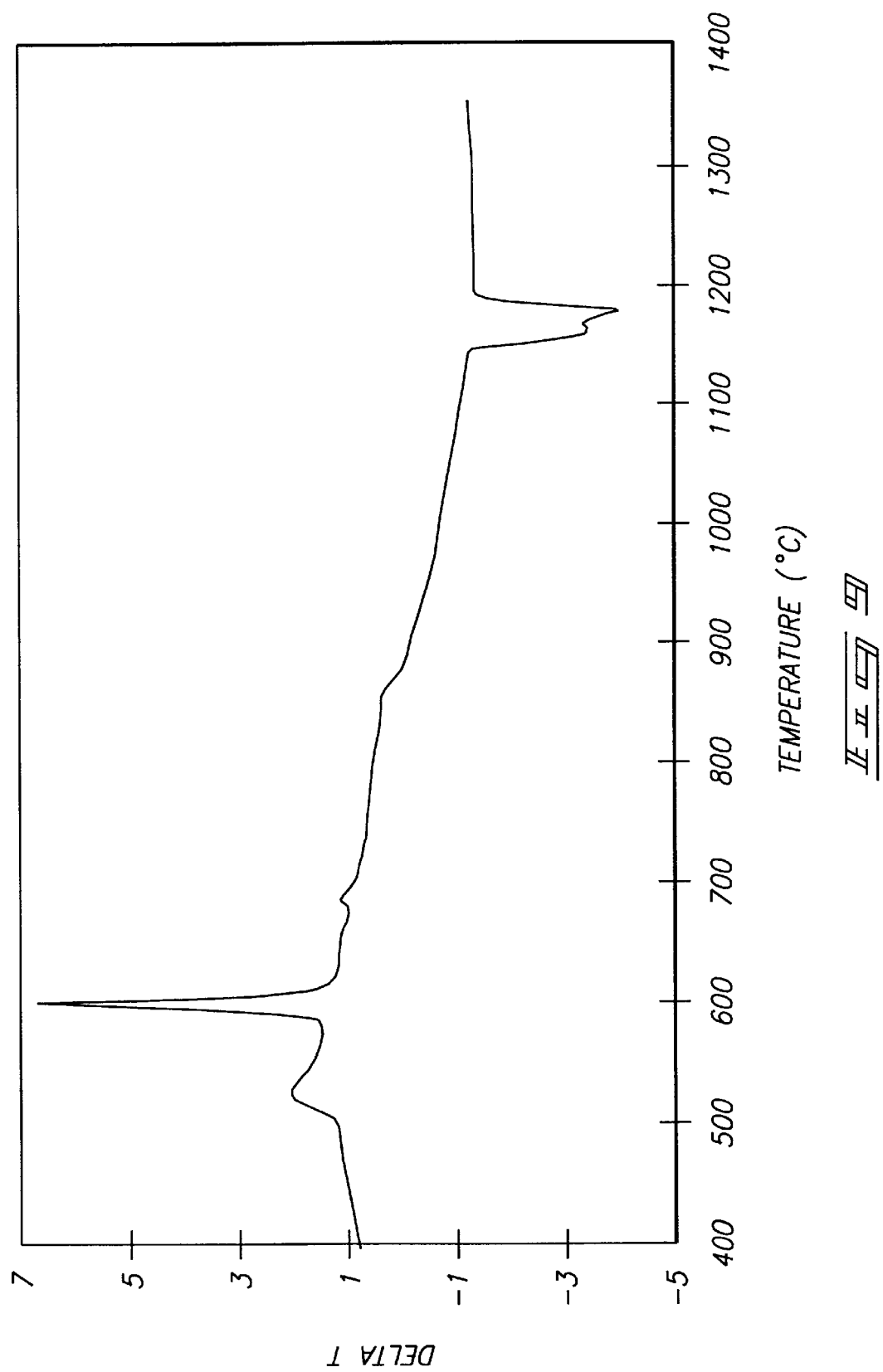

Referring to FIG. 8, subsequent treatments of the type illustrated in FIG. 6 can be utilized to form multiple heat-treated layers 120 and an exposed outer surface layer 124. Note that one of the lower heat-treated layers 120 is previous layer 106. The subsequent formation of another metallic glass layer over layer 106 has heat-treated the entire layer 106. In particular embodiments wherein layer 106 comprises a metallic glass, such heat treatment can devitrify layer 106. Accordingly, heat treated layers 120 can comprise devitrified metal layers.

Outermost layer 124 is not heat-treated, and can comprise a metallic glass. Accordingly, the method of the present invention has enabled an exterior coating to be formed over layer 100, with said exterior coating comprising devitrified metal layers 120 and an outermost surface of metallic glass 124.

The methodology described with reference to FIGS. 5–8 can have application for a number of uses, including military uses. Specifically, armor can be formed out of a material 100. If the armor becomes punctured or cracked, the methodology of FIGS. 6–8 can be utilized to repair the armor and effectively build a metallic shell over the weakened areas of the armor. Spraying device 104 can be adapted to be utilizable in battlefield situations.

In addition to the utilizations described above for materials of the present invention, the materials can also be utilized as powders for surface finishing (i.e., mechanical blasting) and surface treatments such as, for example, shot peening.

Examples are set forth below to illustrate aspects of the present invention. It is to be understood, however, that the invention is not to be limited to such examples except to the extent the exemplary applications are specifically recited in the claims that follow.

EXAMPLE 1

A modified steel alloy was formed by charging to an arc-furnace suitable amounts of iron, titanium, chromium, molybdenum, boron, carbon, silicon, aluminum, and gadolinium. The composition of the 15 gram alloy (DNA3—see Table 1) was (weight percent); 74.47 Fe, 2.99 Ti, 5.42 Cr, 4.00 Mo, 3.60 B, 1.25 C, 0.59 Si, 1.12 Al, and 6.55 Gd. The solid charges were made into an alloy by arc-melting in argon on a water cooled copper hearth. The melt was homogenized by undergoing several flipping and remelting cycles.

The arc-melted alloy was contained in a quartz crucible with an exit hole diameter of 0.81 mm. The melt was heated up by Rf induction until molten at 1375° C. and then was ejected with a gas pressure of 150 torr onto a moving copper chill wheel (5 mm melt fall). The tangential velocity of the melt-spinning wheel was slowed down to 15 m/s to reduce the average cooling rate below $10^5$ K/s. The melt after rapid solidification, due to thermal contraction differences, was flung off the copper wheel in the form of a tabular flake shaped ribbon (length 1 to 100 cm, width 1 cm, and thickness 20 to 80 $\mu$m).

In FIG. 9, a Differential Thermal Analysis (DTA) scan of the as-solidified DNA3 ribbon is shown. Since a metallic glass is a metastable state, crystallization enthalpy will be released upon heating. The exothermic glass to metastable crystalline and metastable crystalline to crystalline transitions can be seen at 525° C. and 600° C. respectively. The presence of the crystallization peaks shows that the steel alloy has been successfully designed and that its high level of glass forming ability will allow the production of metallic glass at cooling rates achievable in atomization processes.

EXAMPLE 2

A modified steel alloy was formed by weighing out the appropriate amounts of iron, chromium, molybdenum, boron, carbon, silicon, and aluminum. The composition of the 8 lb alloy (alloy DNS2C—see Table 1) in weight percent was; 78.08 Fe, 9.23 Cr, 4.26 Mo, 4.08 B, 1.33 C, 0.62 Si, and 2.40 Al. The elements were placed into a zirconia crucible coated with BN and the crucible was placed in a close coupled annular gas atomization system. The crucible had a pour tube with an internal exit hole diameter of 0.100" (inch). The melt was heated up by Rf induction until a liquid melt temperature of 1550° C. was obtained at an argon pressure of 1 atmosphere. The liquid melt was atomized with 350 psi helium gas to form spherical particles with an average diameter of about 40 $\mu$m. The sieve analysis of the atomized run is shown in FIG. 10.

Figure 11:
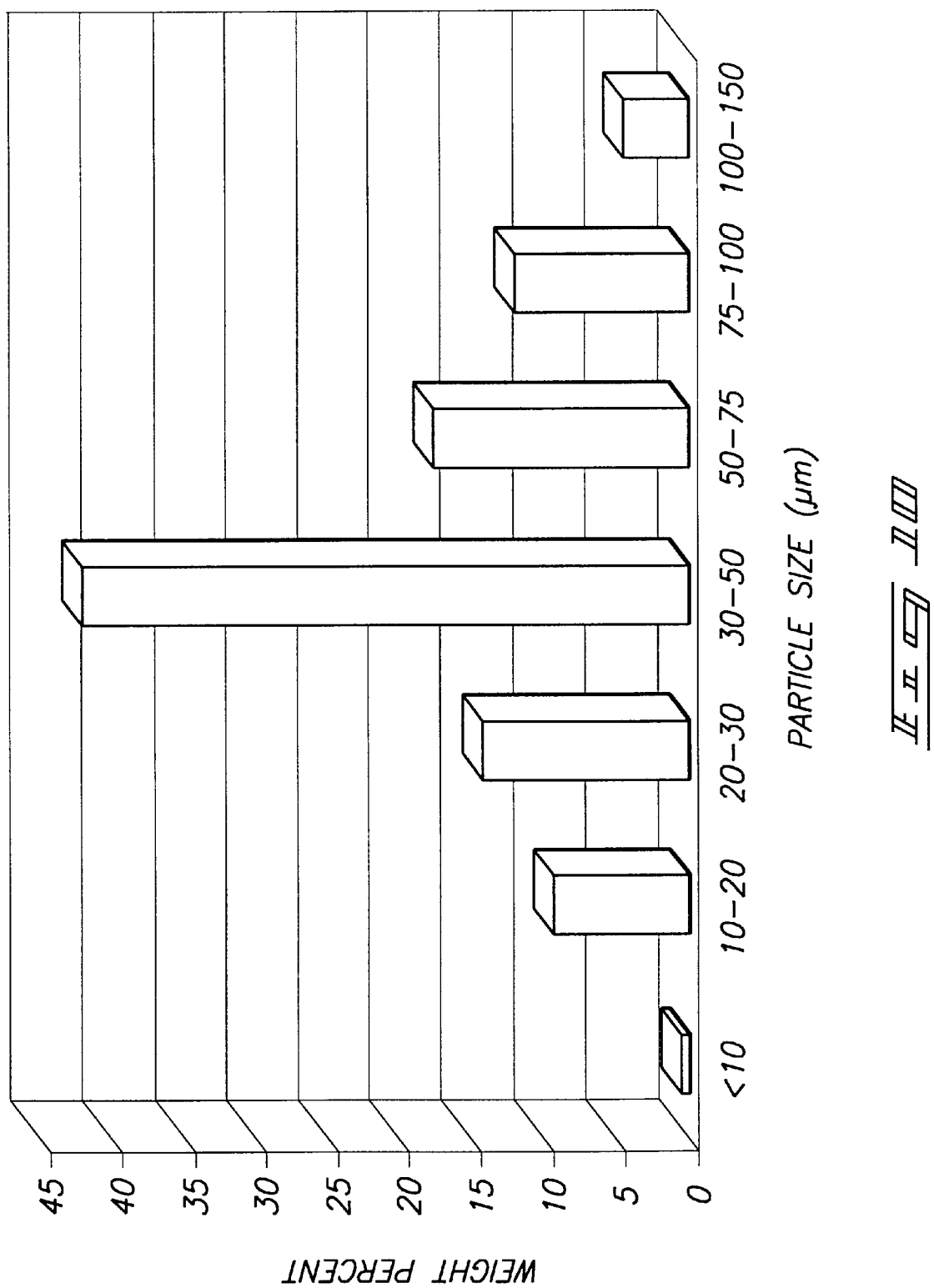
FIG. 11 is a graph of intensity vs. two-theta illustrating data obtained by an X-ray diffraction scan of sieved as-solidified 10–20 µm gas atomized powder particles of the alloy identified as DNS2C. The lack of Bragg diffraction peaks and broad amorphous hump indicate the development of a metallic glass structure.
Figure 11:
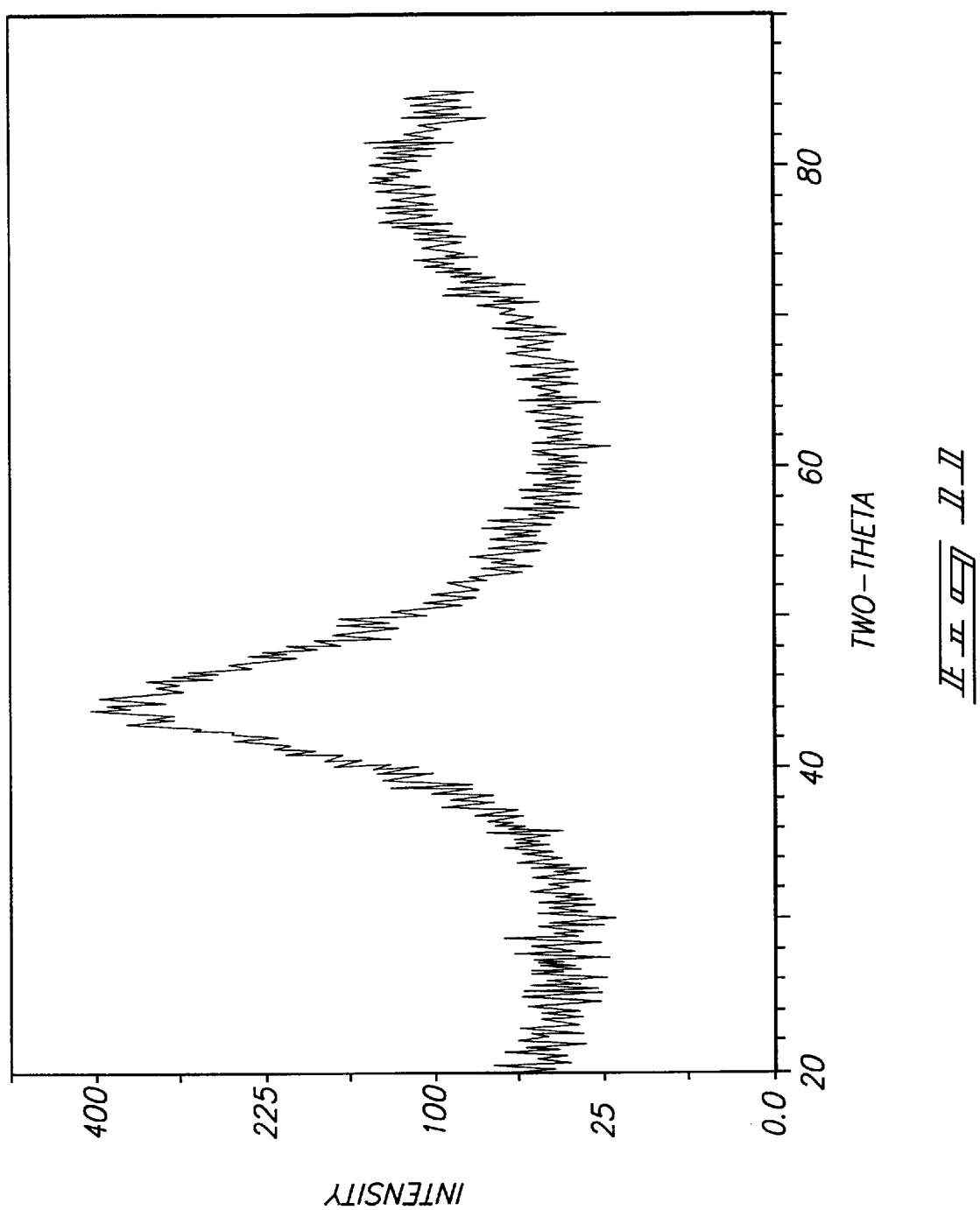
Figure 12:
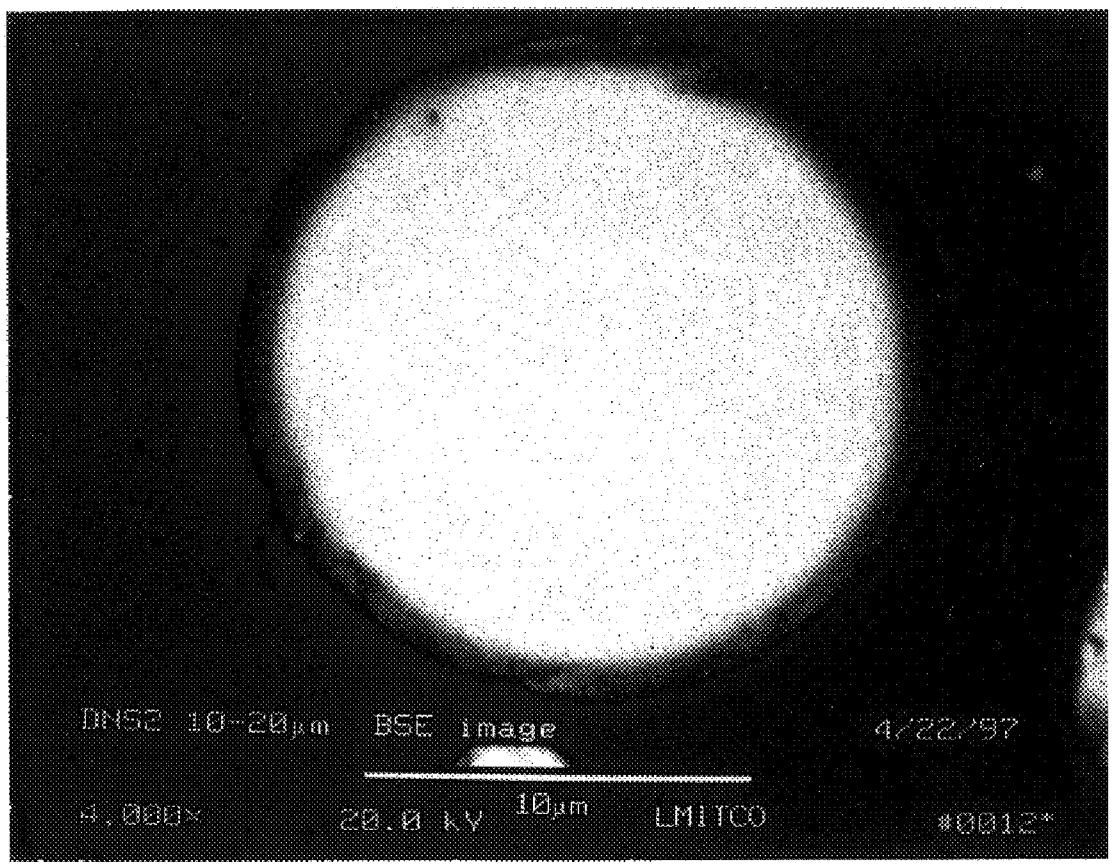
FIG. 12 is a backscattered electron micrograph of an assolidified 10–20 µm gas atomized powder particle of the alloy identified as DNS2C. The homogeneous microstructure and lack of grain or phase boundaries is consistent with the development of a metallic glass structure.
Figure 13:
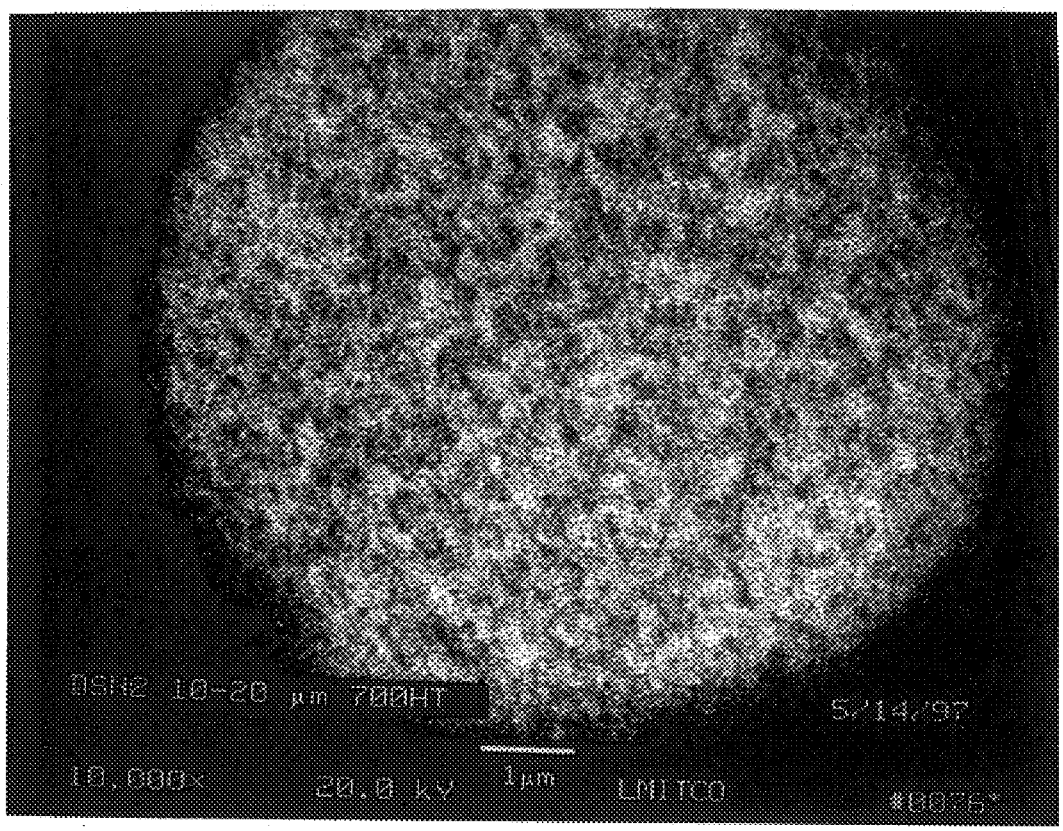
FIG. 13 is a backscattered electron micrograph of a heat-treated (700° C. for 1 hour) 10–20 µm gas atomized powder particle of the alloy identified as DNS2C. The grain size, which is barely perceptible, is below 1 µm in size.
Figures 4, 11A:
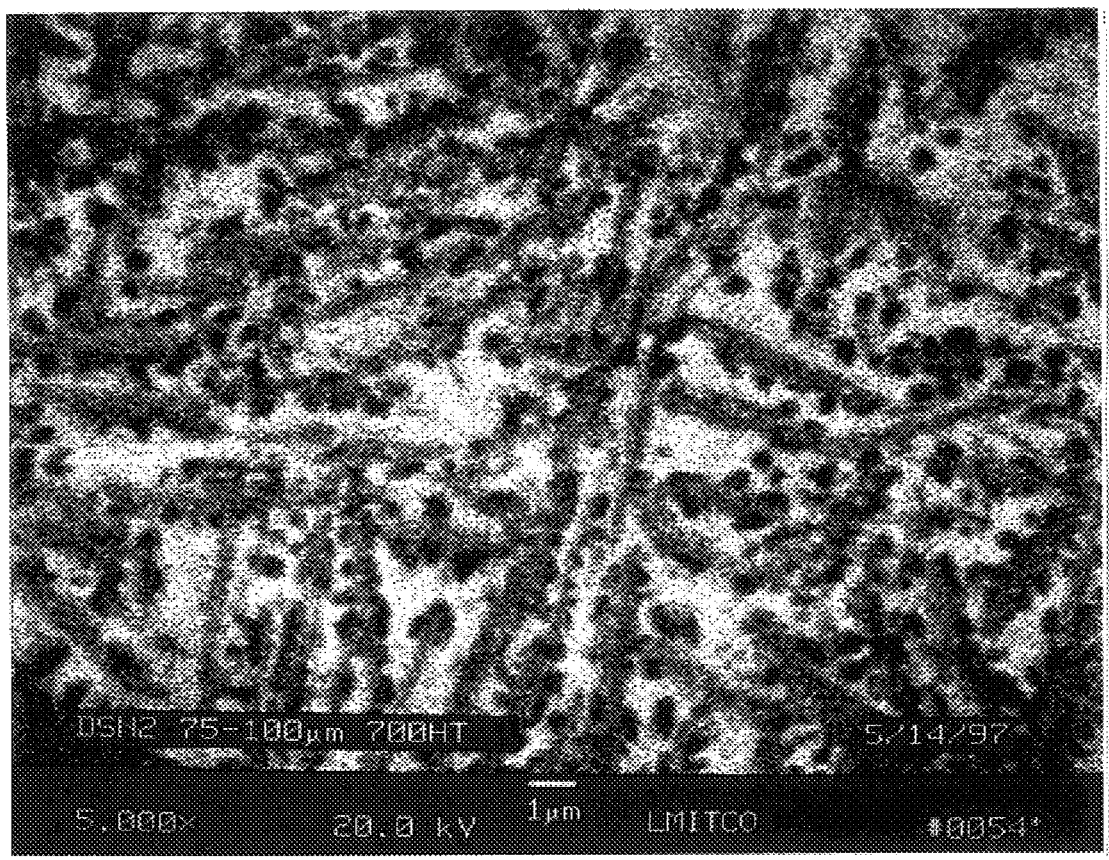
Figure 15:
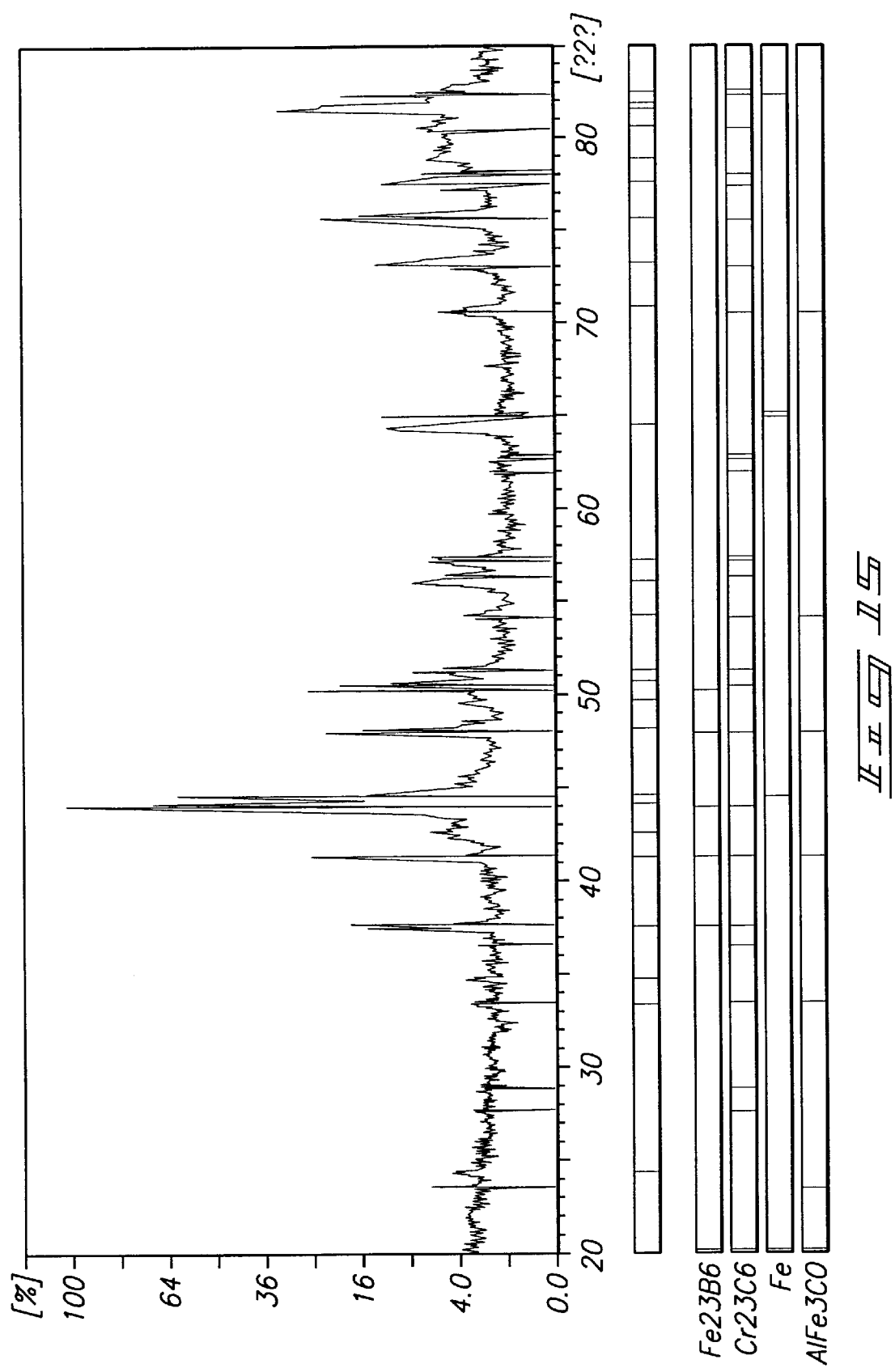
FIG. 15 is an X-ray diffraction diagram of the 75–100 µm gas atomized powder which has been heat treated at 750° C. for 1 hour. Several of the composite phases have been identified including $Fe_{23}B_6$, $Cr_{23}C_6$, α—Fe, and $AlFe_3C_{0.5}$. Note that diffraction peaks from phases only show up in the X-ray diagrams if the phase is present is excess of 5 volume percent, indicating that additional unidentified phases are also present.

An X-ray diffraction scan of sieved 10–20 $\mu$m particles is shown in FIG. 11. The absences of sharp Bragg diffraction peaks and the presence of the broad amorphous hump indicates the alloy was produced in an amorphous condition. Differential Thermal Analysis (DTA) and Differential Scanning Calorimetry (DSC) analysis verified that a complete or partially amorphous glass structure was produced in the as-atomized powder up to 150 $\mu$m in powder particle size (see Table 2). A backscattered electron micrograph taken in the scanning electron microscope shows that the as-solidified microstructure is featureless which is consistent with the amorphous structure (FIG. 12). After heat treating the powder in a vacuum for one hour vacuum at 700° C., the powder crystallized into a multiphase microstructure. The 10–20 μm heat-treated powder had an extremely fine microstructure barely resolvable with the capabilities of the SEM (FIG. 13). The 75–100 μm heat-treated powder had a fine multiphase microstructure with grain and phase sizes below 1 μm (FIG. 14). In the X-ray diffraction diagrams, several of the phases making up the composite were identified, including α—Fe, $Fe_{23}B_6$, $Cr_{23}B_6$, and $AlFe_3Co_{0.5}$ (FIG. 15).

TABLE 2

| Alloy | DNS2C | | DNA3 | | DNA6 | |
|---|---|---|---|---|---|---|
| Particle Size (μm) | Peak Temp (° C.) | Enthalpy (−J/g) | Peak Temp (° C.) | Enthalpy (−J/g) | Peak Temp (° C.) | Enthalpy (−J/g) |
| <10 | 580 | 146 | 588 | 89 | 547 | 93 |
| 10–20 | 581 | 146 | 588 | 95 | 547 | 95 |
| 20–30 | 580 | 143 | 588 | 90 | 547 | 91 |
| 30–50 | 581 | 95 | 588 | 91 | 542 | 57 |
| 50–75 | 580 | 0.3 | 586 | 72 | 536 | 5 |
| 75–100 | 580 | 0.2 | 579 | 37 | 542 | 2 |
| 100–150 | 581 | 0.1 | 579 | 6 | 542 | 3 |
| Flake | | 50 | | 88.2 | | |

EXAMPLE 3

A modified steel alloy was formed by weighing out the appropriate amounts of iron, nickel, titanium, chromium, molybdenum, boron, carbon, silicon, aluminum, and gadolinium. The composition of the 8 lb alloy (alloy DNA6—see Table 1) in weight percent was; 64.86 Fe, 9.74 Ni, 2.98 Ti, 5.39 Cr, 3.98 Mo, 3.59 B, 1.25 C, 0.58 Si, 1.12 Al, and 6.52 Gd. The elements were placed into a zirconia crucible coated with BN and the crucible was placed in a close-coupled annular gas atomization system. The crucible had a pour tube with an internal exit hole diameter of 0.090" (inch). The melt was heated by Rf induction until a liquid melt temperature of 1650° C. was obtained at an argon pressure of 1 atmosphere. The liquid melt was atomized with 300 psi helium gas to form spherical particles from submicron to 150 μm in diameter. Additionally, approximately 1 lb of gas atomized flake was formed during the atomization run. The flake formed from molten particles hitting the wall of the atomizer, solidifying on the water cooled stainless steel atomizer wall, and then falling off into the collection chamber.

Figure 16:
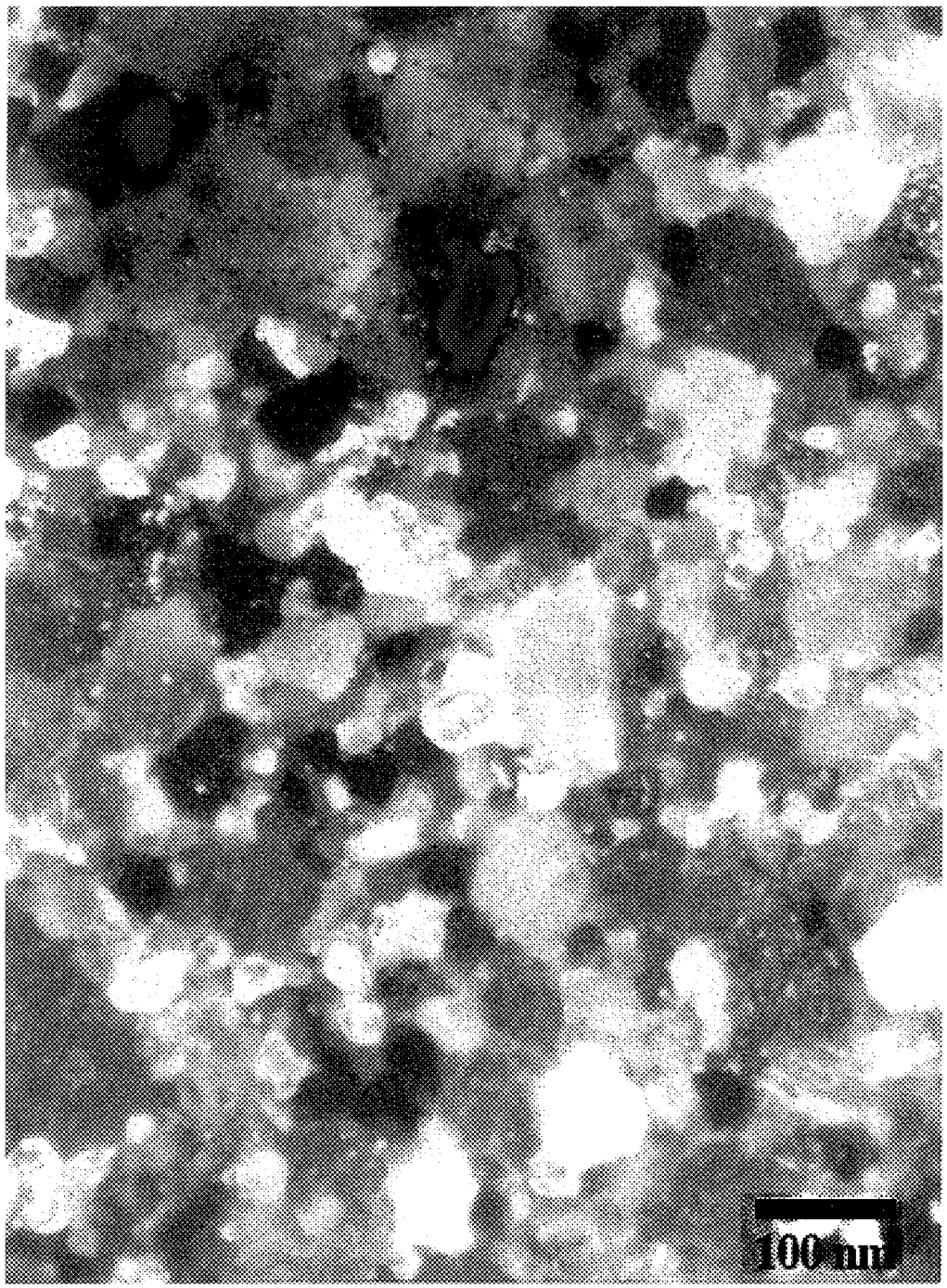
FIG. 16 is a darkfield transmission electron microscope micrograph of a gas atomized flake of an alloy identified below as DNA6. The flake has been heat treated at 650° C. for one hour. The nanoscale nanocomposite microstructure is extremely fine with both grain and phase sizes less than 100 nm.
Figure 11:
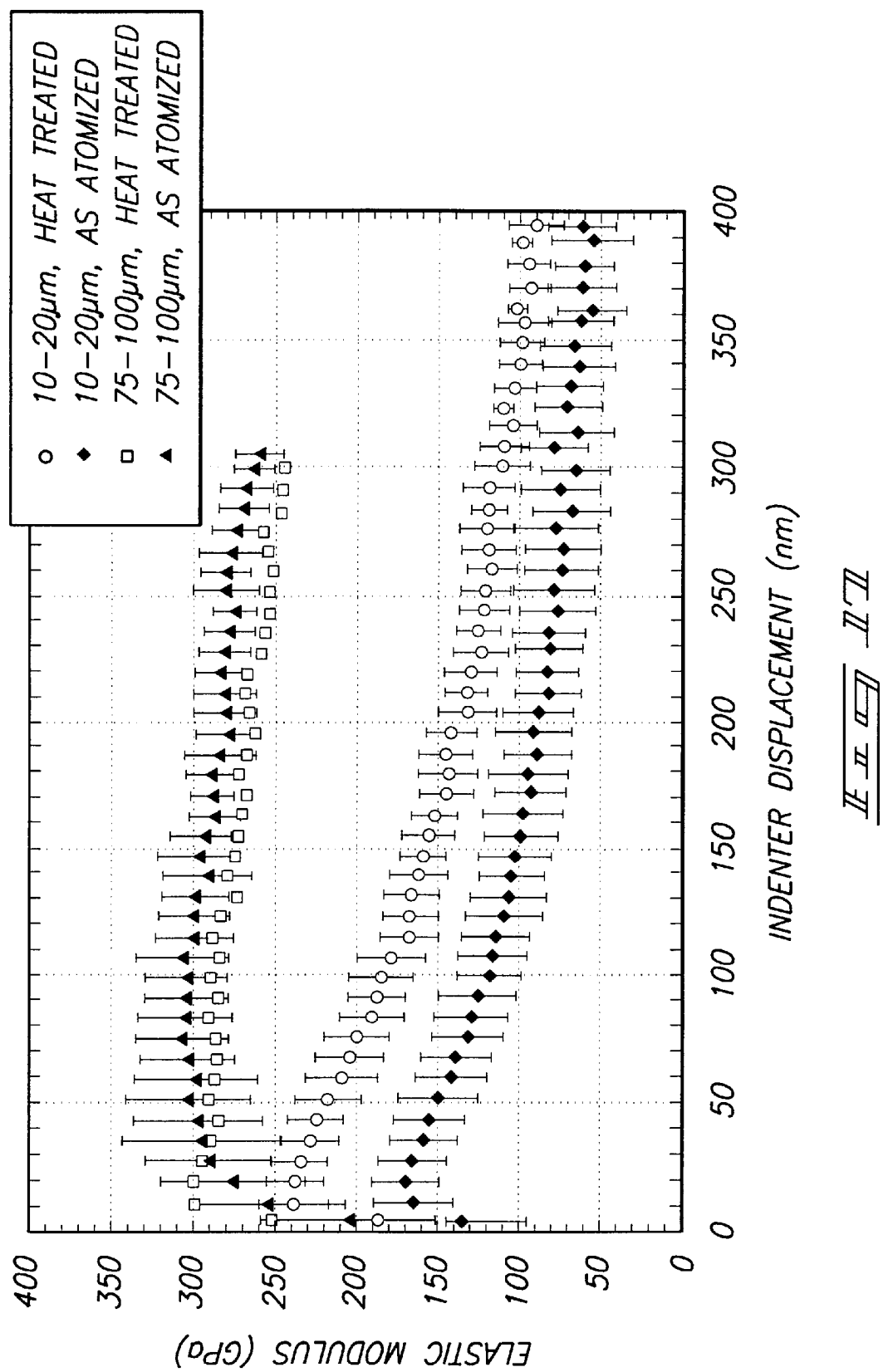
Figure 11B:
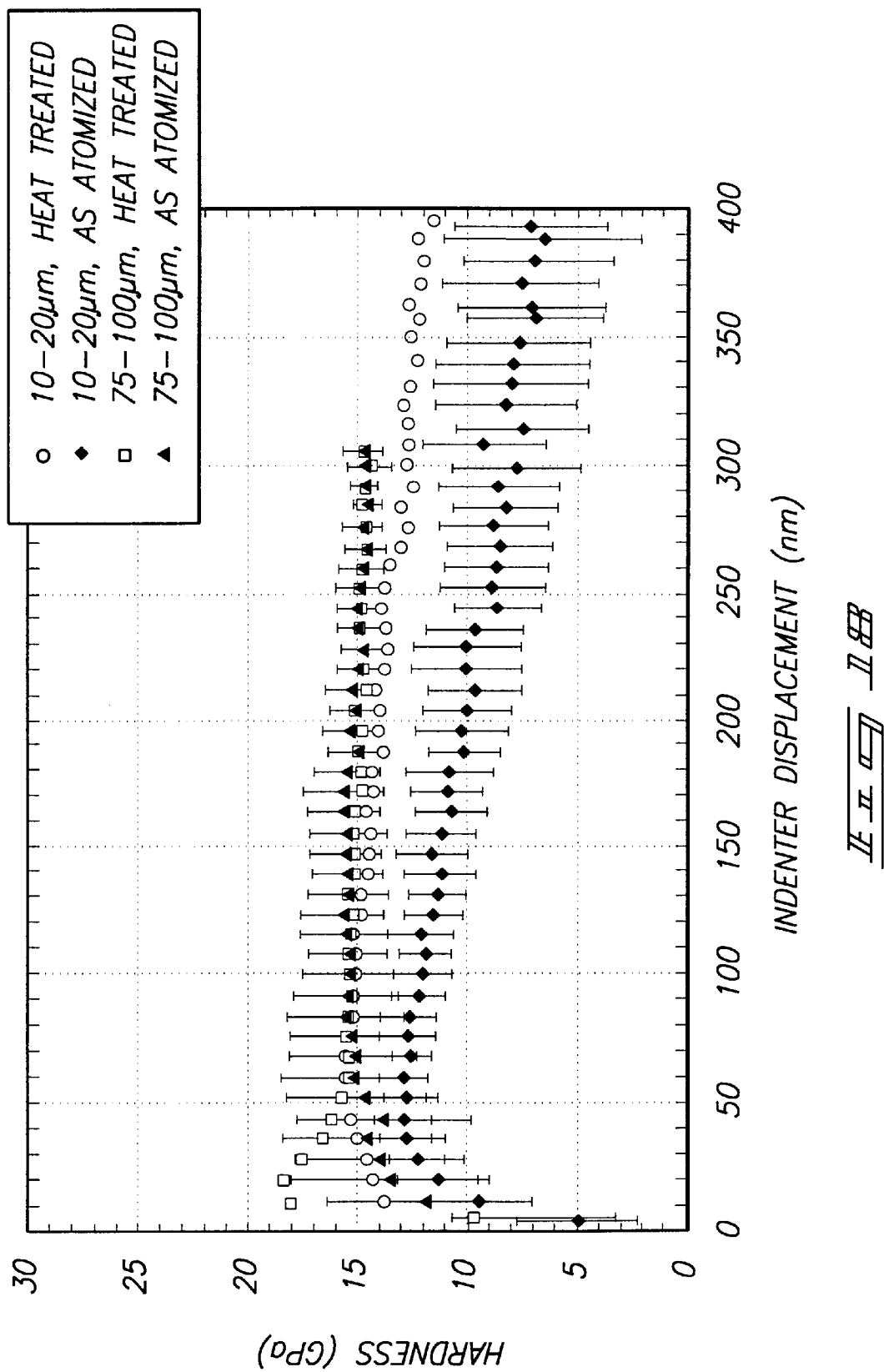

DTA/DSC analysis of the gas atomized powder particles showed that they developed an amorphous structure upon solidification (see Table 2). Since it is difficult to make TEM specimens of the gas atomized powder particles, TEM specimens were made of the heat treated gas atomized flake. After heat treating the flake at 650° C. for 1 hour, the amorphous precursor crystallized into an intimately mixed multiphase nanoscale nanocomposite microstructure (FIG. 16). Both the grain and phase sizes were well below 100 nm in size.

EXAMPLE 4

Four samples of DNS2C powder (10–20 μm as-atomized, 10–20 μm heat treated at 700° C. for 1 hour, 75–100 μm as-atomized, 75–100 μm heat treated at 700° C. for 1 hour) were mounted in epoxy and polished to reveal the powder cross sections (using standard metallographic practices). The mounted particles were then tested by a Nano Instrument using a Berkovich Nanoindentor. The Elastic Modulus was measured versus distance for the 4 samples and they exhibited very high elastic moduli, typically from 150 to 300 GPa (FIG. 17). On these same samples, the hardness was tested versus depth, and they showed extreme hardness from 10 to 18 GPa (FIG. 18). Since plasticity was fully developed, the yield strength can be estimated to be equal to ⅓ the hardness or 725 ksi.

Figure 19:
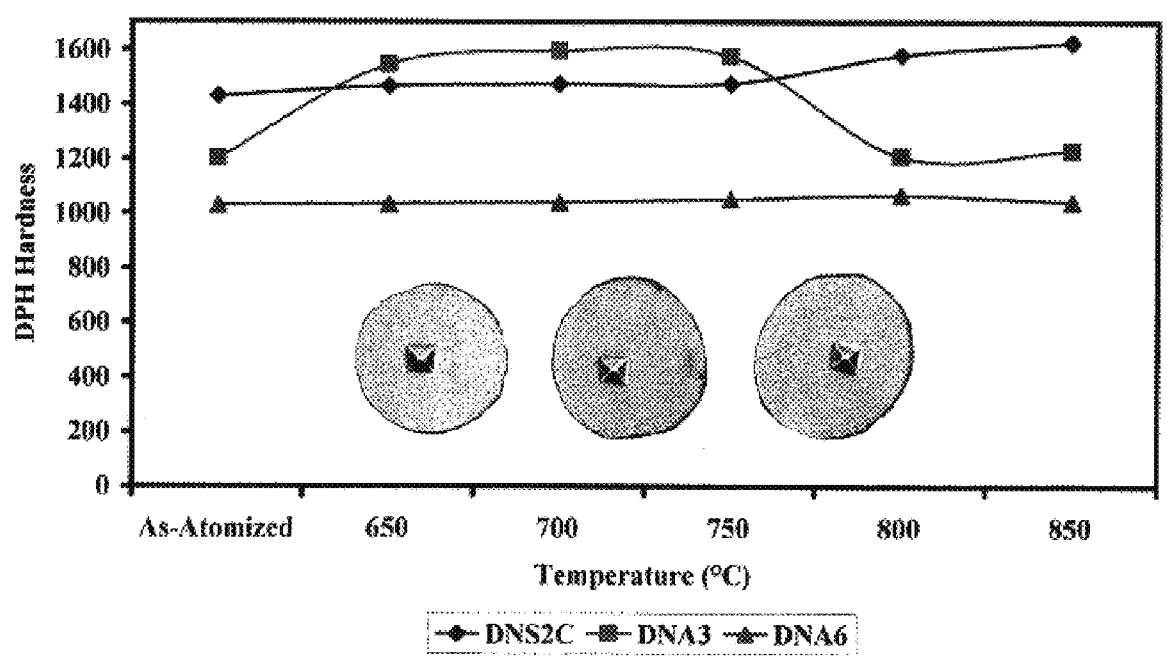
FIG. 19 shows the results of diamond pyramid hardness (DPH) tests on 75–100 gas atomized particles of alloys DNS2C, DNA3, and DNA6 in the as-solidified state and as a function of heat treatment temperature at a constant 1 hour annealing time. The powder particles, consistent with the nanoindentor testing, were found to exhibit extreme hardness. In the inset of FIG. 19, the actual diamond indentations on individual powder particles can be seen. No cracking was ever observed from the cube corners indicating that the particles have significant ductility and fracture toughness.

Diamond pyramid hardness (DPH) tests were done on the cross sections of the 75–100 gas atomized particles for the DNS2C, DNA3, and DNA6 alloys mounted in the same method as above. The hardness of the powder was studied in the as-solidified state and as a function of heat treatment temperature at a constant 1 hour annealing time (FIG. 19). Note that the hardness data is reported as an average of ten independent measurements using 10 different powder particles. The powder particles, consistent with the nanoindentor testing were found to exhibit extreme hardness from 1000 to 1600 DPH. In the inset of FIG. 19, the actual diamond indentations on individual powder particles can be seen. No cracking was ever observed from the cube corners indicating that the particles have significant ductility and fracture toughness.

EXAMPLE 5

Figure 20:
FIG. 20 illustrates an exemplary result of Standard Depth of Penetration tests using 165 grain 0.30 caliber armor piercing APM2 rounds on a test specimen of alloy DNA3. The APM2 bullet, which barely penetrated the aluminum test block can be seen near the center of the photomicrograph. Also, note that the circular outline where the 1/8" thick 2" diameter steel sample was mounted can be seen.
Figure 21:
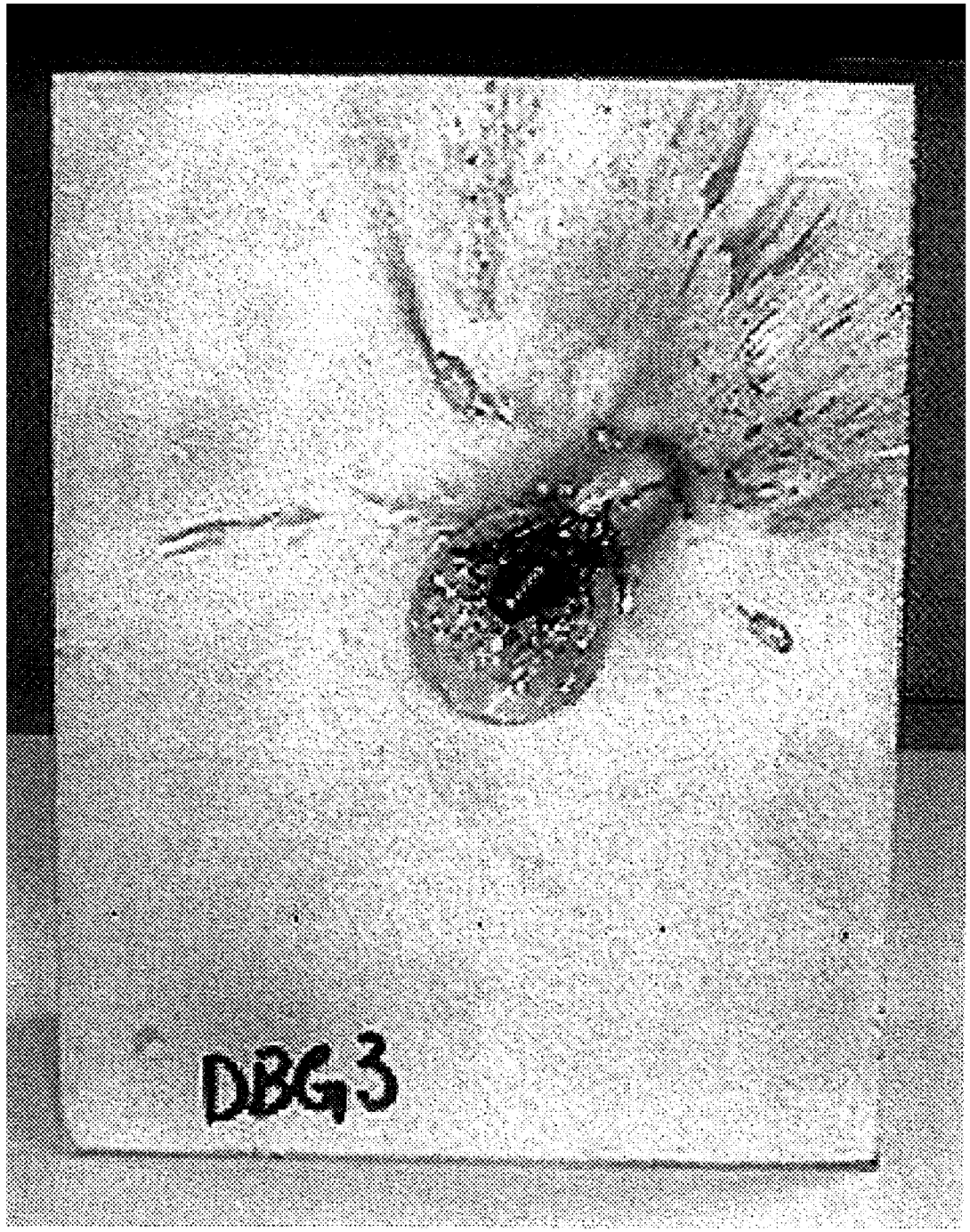
FIG. 21 illustrates an exemplary result of Standard Depth of Penetration tests using 165 grain 0.30 caliber armor piercing APM2 rounds on a test specimen of alloy DNCS2. The APM2 bullet, which barely penetrated the aluminum test block can be seen near the center of the photomicrograph. Note that the bullet upon impact was deflected almost 90°.

One 4 lb sample of alloy DNS2C (sieved below 50 μm) and one 4 lb sample of DNA3 (sieved below 75 μm) were sealed in an evacuated mild steel can. The sealed cans were heated up to 950° C. and a force of 275 tons was applied to each to force a 16 to 1 reduction of the can through a 0.5 inch diameter die. The hot extrusions were not successful due to the high yield strength of the powder. The less than fully dense flawed specimens were subsequently cut into ⅛" thick circular cross sections. Standard Depth of Penetration tests using 165 grain 0.30 caliber APM2 rounds were then performed after gluing the test samples to three inch thick 6061 aluminum witness blocks. The results of the ballistic testing can be seen in FIG. 20 (alloy DNA3) and in FIG. 21 (alloy DNS2C). The armor piercing bullet can be seen near the center of each of these photos. Thus, while the flawed steel specimen did crack apart, it nevertheless effectively prevented the armor piercing bullet from penetrating through the test aluminum block.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method of forming a steel, comprising:
    forming a metallic glass;
    converting at least a portion of the glass to a crystalline steel material having a nanocrystalline scale grain size; and
    transforming a portion of the crystalline steel material to metallic glass.

2. The method of claim 1 wherein the converting comprises heating the metallic glass to a temperature of at least about 500° C. and less than the melting temperature of the glass.

3. The method of claim 1 further comprising, after the converting, treating at least a portion of the crystalline steel to transform a crystalline microstructure of at least a portion of the crystalline steel to an amorphous structure.

4. A method of forming a steel, comprising:

forming a molten alloy;

cooling the alloy at a rate which forms a metallic glass;

devitrifying the metallic glass to convert the glass to a crystalline steel material having a nanocrystalline scale grain size; and transforming a portion of the crystalline steel material to metallic glass.

5. The method of claim 4 wherein the devitrifying comprises heating the metallic glass to a temperature of at least about 500° C. and less than a melting temperature of the glass.

6. The method of claim 4 wherein the devitrifying comprises heating the metallic glass to a temperature of at least about 600° C. and less than a melting temperature of the glass by extruding the metallic glass.

7. The method of claim 4 wherein the devitrifying comprises first heating the metallic glass to a temperature of at least about 600° C. and less than a melting temperature of the glass, and second heating the metallic glass to a temperature of at least about 750° C. and less than a melting temperature of the glass.

8. The method of claim 4 wherein the molten alloy comprises:

at least 50% Fe;

at least one element selected from the group consisting of Ti, Zr, HF, V, Nb, Ta, Cr, Mo, W, Al, La, Ce, Pr, Nd, Sm, Eu, Gd, Tb, Dy, Ho, Er, Tm, Yb, and Lu; and at least one element selected from the group consisting of B, C, N, O, P and S.

9. The method of claim 4 wherein the molten alloy comprises a material selected from the group consisting of $Fe_{69}Zr_3Mo_7P_{16}C_3Si_2$, $Fe_{71}Ti_3Cr_7B_{14}C_3Si_2$, $Fe_{68}Cr_4Mo_7P_{12}B_6C_3$, DNA3, DNS2C, and DNA6.

10. The method of claim 4 wherein the molten alloy comprises one or more of DNA3, DNA6 and DNS2C, and wherein the cooling comprises cooling at a rate of less than $10^6$ K/s.

11. The method of claim 4 further comprising subjecting the crystalline steel material to a treatment comprising at least one of spray forming, high pressure plasma spraying, and low pressure plasma spraying.

12. The method of claim 4 further comprising heating and cooling at least a surface of the crystalline steel material to convert at least some of the crystalline steel material to a predominately amorphous material.

13. The method of claim 4 further comprising subjecting the crystalline steel material to laser glazing to convert at least a surface of the crystalline steel material to a predominately amorphous glass material.

14. A method of forming a steel, comprising:

providing a first metallic glass steel substrate;

forming a molten alloy over the first metallic glass steel substrate to heat and devitrify at least some of the underlying metallic glass of the steel substrate.

15. The method of claim 14 wherein the molten alloy solidifies as a second metallic glass substrate, and further comprising forming a second molten alloy over the second metallic glass steel substrate to heat and devitrify the second metallic glass steel substrate.

16. The method of claim 14 wherein the molten alloy comprises:

at least 50% Fe;

at least one element selected from the group consisting of Ti, Zr, Hf, V, Nb, Ta, Cr, Mo, W, Al, La, Ce, Pr, Nd, Sm, Eu, Gd, Tb, Dy, Ho, Er, Tm, Yb, and Lu; and at least one element selected from the group consisting of B, C, N, O, P and S.

17. The method of claim 14 wherein the forming the molten alloy over the first metallic glass steel substrate comprises spraying the molten alloy.

18. The method of claim 14 wherein the molten alloy comprises a material selected from the group consisting of $Fe_{69}Zr_3Mo_7P_{16}C_3Si_2$, $Fe_{71}Ti_3Cr_7B_{14}C_3Si_2$, $Fe_{68}Cr_4Mo_7P_{12}B_6C_3$, DNA3, DNS2C and DNA6.

19. The method of claim 14 wherein the first metallic glass substrate comprises a material selected from the group consisting of $Fe_{69}Zr_3Mo_7P_{16}C_3Si_2$, $Fe_{71}Ti_3Cr_7B_{14}C_3Si_2$, $Fe_{68}Cr_4Mo_7P_{12}B_6C_3$, DNA3, DNS2C and DNA6.

20. The method of claim 14 wherein the first metallic glass substrate comprises an alloy selected from the group consisting of $Fe_{69}Zr_3Mo_7P_{16}C_3Si_2$, $Fe_{71}Ti_3Cr_7B_{14}C_3Si_2$, $Fe_{68}Cr_4Mo_7P_{12}B_6C_3$, DNA3, DNS2C and DNA6; and wherein the molten alloy comprises an alloy selected from the group consisting of $Fe_{69}Zr_3Mo_7P_{16}C_3Si_2$, $Fe_{71}Ti_3Cr_7B_{14}C_3Si_2$, $Fe_{68}Cr_4Mo_7P_{12}B_6C_3$, DNA3, DNS2C and DNA6.

21. A method of forming a steel, comprising:

forming a metallic glass;

converting at least a portion of the glass to a crystalline steel material having a nanocrystalline scale grain size; and after the converting, treating at least a portion of the crystalline steel to transform a crystalline microstructure of at least a portion of the crystalline steel to an amorphous structure.

22. A method of forming a steel, comprising:

forming a molten alloy;

cooling the alloy at a rate which forms a metallic glass;

devitrifying the metallic glass to convert the glass to a crystalline steel material having a nanocrystalline scale grain size; and subjecting the crystalline steel material to laser glazing to convert at least a surface of the crystalline steel material to a predominately amorphous glass material.

* * * * *